INVENTOR
HENRY F. IRVING

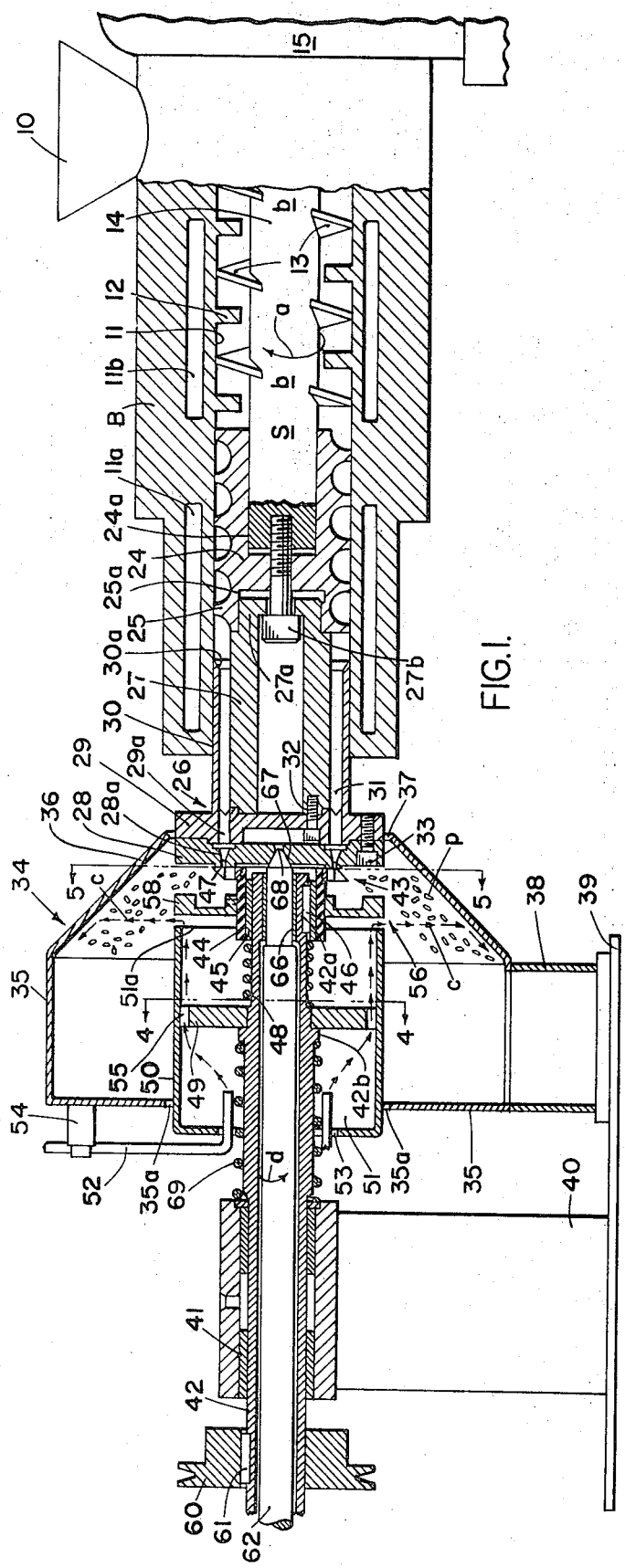

United States Patent Office 3,564,650
Patented Feb. 23, 1971

3,564,650
APPARATUS FOR EXTRUDING PLASTIC STRANDS AND CUTTING THEM UP INTO PELLETS
Henry F. Irving, Saginaw, Mich., assignor to Baker Perkins Inc., Saginaw, Mich., a corporation of New York
Continuation-in-part of application Ser. No. 461,840, June 7, 1965. This application Dec. 6, 1967, Ser. No. 688,398
Int. Cl. B29f 3/00
U.S. Cl. 18—12        24 Claims

ABSTRACT OF THE DISCLOSURE

Pelletizing apparatus, including a barrel with a reciprocating and rotating mixer shaft therein, and die means on the end of the shaft with axially extending ports for extruding strands of plastic material therethrough, and wherein rotary knife means mounted for reciprocation with the shaft cuts the strands into pellets.

---

This application is a continuation-in-part of my application, Ser. No. 461,840, filed June 7, 1965, and entitled "Mixing and Severing Apparatus."

One of the prime objects of the invention is to provide apparatus of the character described which delivers a steady flow of plastic material through axial extrusion ports so that pellets of uniform size and shape may be manufactured by the apparatus.

Another object of the invention is to provide mixer apparatus of the type described wherein the rotation of the mixer shaft is utilized in the cutting or dicing operation.

Still another object of the invention is to provide reliable, yet economical, pelletizing apparatus, including mechanism for distributing a coolant fluid to receive and cool the pellets cut off in a manner which prevents the fluid from reaching and cooling the face of the extrusion die.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion and minor details of construction, without departing from the spirit or sacrificing any of the advantages of the invention.

Referring now more particularly to the accompanying drawings:

FIG. 1 is a sectional, side elevational view of the apparatus;

FIG. 2 is an enlarged, fragmentary, sectional, side elevational view, illustrating the extreme left end of the machine, which was omitted from FIG. 1;

FIG. 3 is a slightly reduced, fragmentary, sectional, elevational view, showing the mixer shaft turned end-for-end and illustrating the manner in which the mixer shaft is driven;

Figure 5:
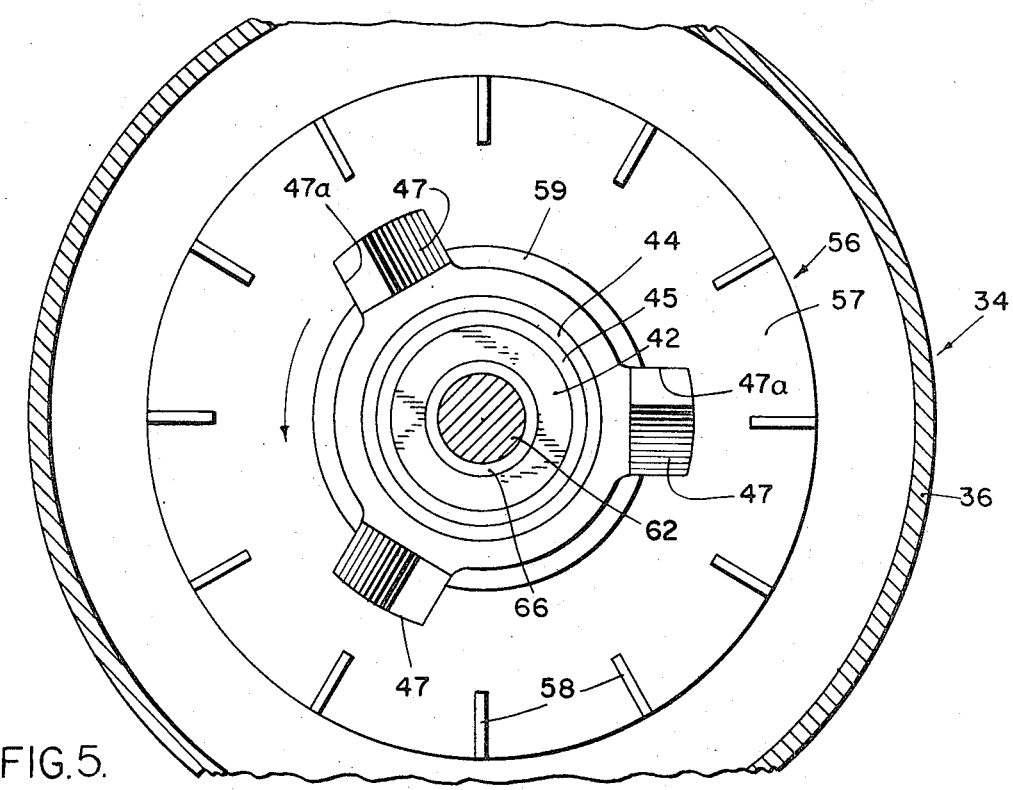
FIG. 5 is an enlarged, transverse, sectional view taken on the line 5—5 of FIG. 1.

Referring now more particularly to the accompanying drawings in which I have shown a preferred embodiment of the invention only, a letter B generally refers to a jacketed tubular mixing barrel which may include annular passages 11a and 11b for circulating a temperature maintaining heating or cooling fluid, depending on the mixing operation to be performed. A mixer of this general character is disclosed in the present assignee's U.S. Pat. No. 3,023,455, granted Mar. 6, 1962, to Herbert F. Geier and Henry F. Irving, and the present machine similarly includes a feed hopper 10 leading into the chamber or bore 11 of the barrel B for delivering the ingredients to be mixed to the chamber 11. Provided in the barrel B are circumferentially spaced, radially inwardly projecting teeth or lugs 12 of the character disclosed in the patent mentioned, which cooperate with interrupted helical threads or blades 13 provided on a portion 14 of a mixer shaft S in helical formation in a manner to achieve the intimate blending and kneading of the material introduced to the chamber 11. The threads or flight sections 13 are so pitched that, if the shaft S is revolved in a clockwise direction as viewed from the right end of the machine (see the arrow a), the material will be moved forwardly from right to left, it being understood that shaft S is simultaneously reciprocated in timed relation with its rotation and the disposition of teeth 12 so that during the stroke of the shaft S the teeth 12 pass through the spaces b between the interrupted blades 13. It may be assumed that the blades which form the thread portions 13 are interrupted at 180° intervals, and the shaft then, of course, must rotate 180° during both the forward and rearward portions of the reciprocatory stroke.

As FIG. 3 indicates, the housing 15, rearwardly of the feed hopper 10, is provided with a pair of fixed cam follower projections 16 which ride in cam tracks 17 provided in a pair of side-by-side cams 18 which are keyed on the rear end of mixer shaft S. As the shaft S is revolved by a motor (not shown) through a suitable gear reduction unit (not shown), the rotary travel of the cams 18, which are fixed on shaft S, causes the shaft to have an axial reciprocating stroke. At its rear end the shaft S is supported by bearings 21 which are mounted by the casing section 15. Fixed to the shaft S to revolve and reciprocate with it are slide bearing sleeves 20 and 21a and a gear 22, keyed as at 22a, to the rear slide bearing sleeve 21a is connected through a suitable gear reduction unit (not shown) to the drive motor and drives the sleeve 21a and shaft S at the desired speed in terms of revolutions per minute. The gear reduction unit and motor may be housed in a suitable casing portion 23.

At its front end the shaft portion 14 mounts an advancing screw section 24, also forming part of shaft S, and having flights 25 which move the plasticized materials forwardly when the shaft S is revolved in the direction a. It will be observed that section 24 has a bore 24a within which the end of shaft portion 14 is received. Mounted on the front end of the advancing screw section 24 is an extruding head assembly generally designated 26, also forming part of the shaft S, which includes a sleeve member 27, having a reduced end portion 27a received in a recess 25a in the front end of the screw section 24 and secured by a bolt 27b which extends into the shaft section 14.

A pair of die assembly plates 28 and 29 cooperate to discharge the material in the form of strands and are provided with material expressing, communicating, circumferentially spaced passages 28a and 29a, respectively. It will be observed that the plate 29 has a rearwardly extending sleeve extension 30 which is mounted for reciprocating and rotating movement in the barrel chamber or bore 11, and which is spaced from the sleeve 27 to provide an annular passage 31 leading to the extruding orifices formed by openings 28a and 29a. The rear edge of the sleeve extension portion 30 is beveled as at 30a to direct the plasticized material inwardly to the chamber 31. Bolts 32 may be provided to secure the plate 29 to the sleeve 27 and bolts 33 may be provided to secure the plate 28 to the plate 29. Because the chamber 31 reciprocates with the screw section 24 and shaft section 14, material is expressed through the exit orifices 28a in a steady stream, rather than in a pulsating stream.

Mounted forwardly of the extruding head 26 which extrudes the strands of plastic material is a strand cutting and pellet cooling assembly, generally designated 34, which includes an outer surrounding cylindrical housing 35 with a conical end section 36, having an opening 37 to permit reciprocation and rotation of the extruding head 26 therein. The housing 35 is supported by a discharge chute portion 38 on a base section 39, as shown, and it will be seen that the base section 39 also mounts bearing supports 40 for bearing members 41 which rotatably and reciprocatably support an elongated cutting knife carrying tubular shaft 42.

Mounted on the shaft 42 at the reduced end 42a thereof, which is adjacent the extruding head assembly 26, is a knife assembly generally designated 43, including a knife holder sleeve 44, which is fixed to the knife holder bushing 45, the bushing 45 being in turn keyed as at 46 to the shaft 42. The sleeve 44 is preferably formed of a somewhat resilient material such as hard rubber.

As FIG. 5 particularly indicates, the cutting knives, which may be of any suitable type, including those shown in U.S. Pat. No. 2,614,290, comprise knife blades 47 with cutting edges 47a which are revolved past the orifices 28a in a direction counter to the rotation of shaft S, as later will be explained. While the knife holder sleeve 44 and bushing 45 rotate with the shaft 42, they are mounted for axial movement on the shaft 42 if it should be necessary, such as when a foreign body would jam between the knife blades 47 and the die face of the plate 28. The coil spring 48, however, which is disposed between a disk 49 fixed on the shaft 42 and the bushing 45, normally bears against the bushing 45 and maintains the cutting edges 47a of the knife blades 47 in engagement with the die plate 28.

Figure 4:
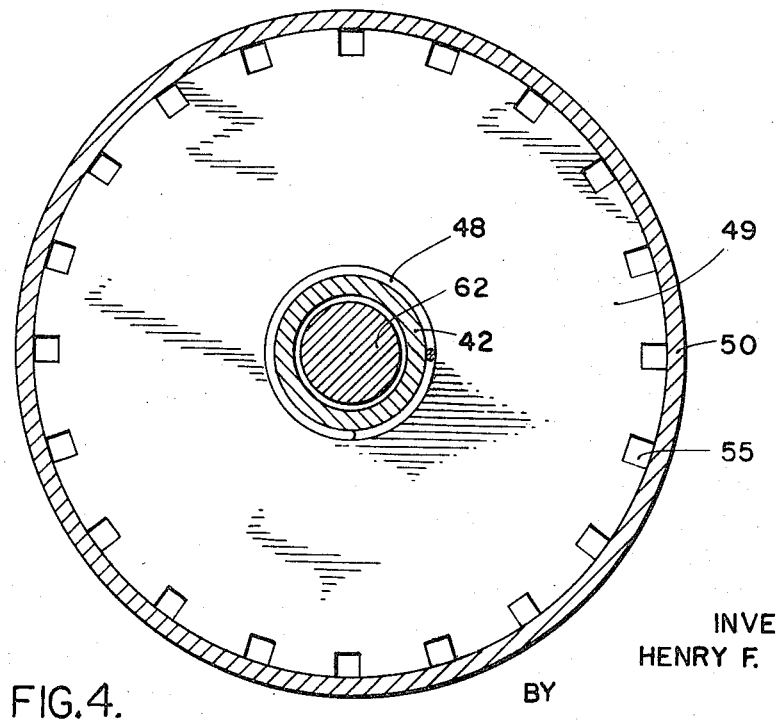
FIG. 4 is an enlarged, transverse sectional view, taken on the line 4—4 of FIG. 1.

The annular plate or disk 49 is received within a rotary fluid coolant supply housing 50 (FIG. 1) which forms an annular chamber 51 open at one end as at 51a. At the opposite end of chamber 51 coolant supplying tubes such as at 52 extend through an annular opening 53 to supply a suitable coolant, such as water, at a predetermined temperature to the chamber 51. Brackets 54 may be utilized to stationarily support the tubes 52 from the housing 35. As FIGS. 1 and 4 indicate, the disk 49 has a series of circumferentially spaced passages 55 in its periphery which permit passage of the coolant and direct it in a fluid stream along the inner peripheral surface of the tube 50.

Mounted on the knife holder sleeve 44 just forwardly of the sleeve 50 is a fan member generally designated 56 which revolves with the knife assembly 43 and creates an air flow causing the coolant to take the path indicated by the arrows c. It will be observed that the path of the coolant, once it leaves sleeve 50, is in substantially a radial plane to form the radial curtain of water c into which the pellets cut off by the knives 47 are hurled. The air stream created by the fan 56 is utilized not only to form the coolant curtain, but also to prevent the coolant from reaching and cooling the die plate 28 since it is necessary to maintain critical extruding temperatures with many plastic materials. As FIG. 5 indicates, the fan 56 comprises a disk member 57, having circumferentially spaced radially extending fan blades 58 thereon, the disk 57 being secured to a hub 59 which may be suitably secured to the knife holder sleeve 44.

A pulley 60, which is keyed to the shaft 42, as at 61, is provided to drive the shaft 42 in a direction of rotation d which is counter to the direction of rotation of the shaft S. The speed of rotation of the knife assembly 43 is satisfactory to hurl the pellets radially outwardly in the path p indicated in FIG. 1 on a trajectory which passes them through the curtain of coolant c.

A pilot shaft member 62 is journaled within the shaft 42 at one end by a ball bearing assembly 63 (see FIG. 2) supported by a member 64 which is threaded as at 65 on the one end of shaft 42. At its opposite end the shaft 62 is journaled by a sleeve 66 interposed between the shaft 62 and shaft 42. A "center" opening 67 in die plate 28, concentric with the axis of rotation of shaft S, receives the conical end 68 of the pilot shaft 62 and a coil spring 69, disposed between the bearing support 40 and a flange 42b on the shaft 42, maintains the end 68 normally in frictional engagement with the opening 67 so that the shaft 62 rotates with the shaft S in the direction of rotation a.

As FIG. 2 indicates, the rear end of the shaft 62 is threaded as at 62a and receives a bearing supporting fitting 70. A bearing retainer 71 is secured to the bearing holder 64, as shown, while a lock nut 73 is threaded on fitting 70 and a jam nut 74 is threaded on the threaded end 62a of shaft 62. Plainly, the assembly shown in FIG. 2 permits relative axial adjustment of the shafts 42 and 62.

In operation, plastic material to be pelletized is supplied to the mixer chamber 11 through the hopper 10 in any suitable manner, but usually in particulate form and then is melted within the chamber 10 and continuously mixed and kneaded therein. Typical plastics which may be processed are polyethylene, polyvinylchloride, polystyrene and polyurethane, but many other plastics and other materials are also suitably processed by the apparatus. The chamber 11 will be maintained at the melt temperature of the material by circulating a heating medium through the barrel chambers 11a and 11b, and the plastic material will be forwarded continuously by the flights 13 and the advancing screw portion 24 to the chamber 31 and out the aligned orifices 29a and 28a in the form of continuous strands. The knife blades 47 which are rotated at a high rate of speed in the direction d, counter to the direction of rotation a of the shaft S and die plates 28 and 29, hurl the plastic pellets through the coolant fluid curtain c which cools them to prevent their agglomeration in the housing 35 as they are discharged to the chute 38. The pilot shaft 62 rotates and reciprocates with the shaft assembly S and the extrusion die plate 28, whereas the knife assembly 43 reciprocates with the shaft S but is revolved in an opposite direction of rotation d, as noted. The effect of the cutting speed of the knife assembly 43, which is responsible for obtaining a proper trajectory for the pellets p cut off, is enhanced because the direction of rotation of the cutting knives 47 is opposite to the direction of rotation of the extruding orifices 28a. The spring 69 is compressed when the shaft 42 and its knife assembly 43 are moved forwardly from right to left in FIG. 1, and operates to maintain the knife assembly 43 in cutting engagement with the die plate 28 when the shaft S returns in the left-to-right direction in FIG. 1. Thus, the spring 69 operates as a return spring for the shaft 42 which then reciprocates with the shaft S. Because sleeve 44 has some resiliency, some tilting or cocking of knives 47 in the area of several thousandths of an inch is possible so that they can adjust to the die face.

The rotating disk 49, with its peripheral openings 55, forces the coolant fluid to remain under the influence of centrifugal force in a path following the inner peripheral surface of the sleeve 50 and the fan blades 58 create an air stream which then turns the coolant radially, as indicated at c in FIG. 1. Air to be circulated by the fan assembly 56, which also has some cooling effect, is drawn through the opening 37 in housing assembly 34, and passes outwardly both through the opening 35a between the housing 35 and the rotary housing sleeve 50 and the pellet discharge chute 38.

Figure 7:
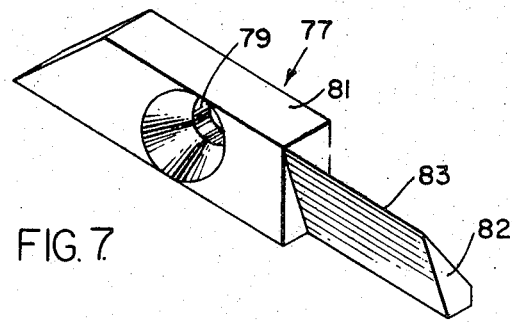
FIG. 7 is a perspective view of one of the knives.
Figure 6:
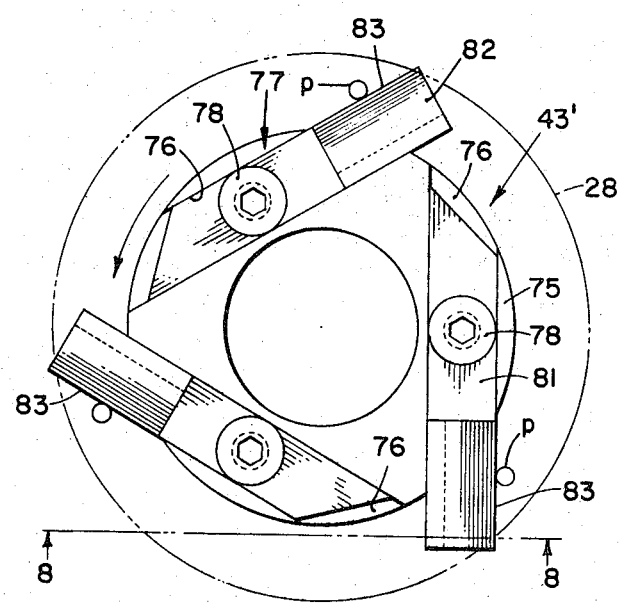
FIG. 6 is a front elevational view of a modified knife assembly.
Figure 8:
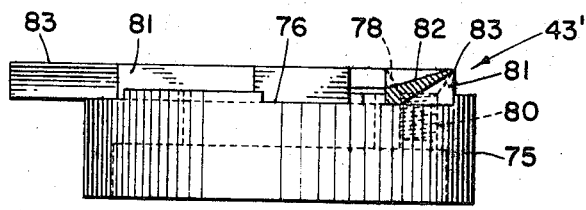
FIG. 8 is a sectional view taken on the line 8—8 of FIG. 6.

In FIGS. 6–8 I have shown a preferred pellet cutting knife assembly which better cuts the pellets in a manner to prevent them from contacting one another and sticking together. As shown, the knife assembly generally designated 43' may comprise a similar hub member 75 which may mount on the shouldered sleeve 44 in the same manner and is provided with what may be described as generally chordally disposed grooves 76 therein to receive knife members generally designated 77. Screws 78 extend through countersunk openings 79 provided in the knife members 77 and thread into threaded openings 80 provided in the hub member 75 to securely anchor the knives 77 in the position in which they are shown in FIG. 6. As FIG. 7 particularly indicates, each knife member 77 includes a block portion 81 having a projecting knife blade 82 with a knife edge 83, the knives 82 projecting sufficiently beyond the grooves 76 to dispose the cutting edges 83 outwardly of the hub member 75 in position to cut the plastic pellets p as the hub member 75 is revolved. The pellets p which are severed by the knives 82 are moved outwardly in a conical path conforming substantially to the inclination of wall 36 and tend to move uniformly in this path so that they do not contact one another while they are still tacky enough to adhere together.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

What I claim is:

1. In a pelletizing mixer: a barrel having inlet means through which material to be mixed therein is supplied to a barrel chamber; a mixer shaft having material forwarding means extending axially in said barrel chamber; means for relatively revolving said barrel and mixer shaft and reciprocating said shaft relative to said barrel to advance material forwardly from said inlet means in an axial direction; an extrusion die mounted on said shaft downstream from said inlet means for reciprocation therewith and having ports therein communicating the interior of said barrel with the exterior thereof, the axially outer ends of said ports being axially outward of said barrel chamber in all positions of said die; cutting means axially exteriorly adjacent said ports for cutting off lengths of material extruded through said ports mounted for axial reciprocation with said shaft and die; and means for moving said cutting means relatively to said shaft rotation at a speed to cut the extruded material into pellets.

2. The combination defined in claim 1 in which it is the shaft which is rotated in said barrel means; said cutting means is mounted for rotation; and means is provided for revolving said cutting means in a direction of rotation opposite to the direction of rotation of said shaft.

3. The combination defined in claim 2 in which means urges said cutting means axially in a direction toward said extrusion port means to return said cutting means when the shaft in its reciprocation would otherwise move away therefrom.

4. The combination defined in claim 2 in which said cutting means comprises a knife mounted for rotation on a reciprocable pilot shaft assembly; and said pilot shaft assembly and die have a pilot interengagement.

5. The combination defined in claim 4 in which said rotary knife is mounted for reciprocation on said pilot shaft assembly; and a spring urges said knife axially toward said port means.

6. The combination defined in claim 5 in which said pilot shaft assembly includes a pilot member revolvable with said mixer shaft.

7. The combination defined in claim 6 in which said pilot member comprises an axially extending shaft having a conical end received in a central conical opening in said extrusion die.

8. The combination defined in claim 7 in which said pilot assembly also includes a non-rotary tubular shaft in which said pilot shaft is rotatably mounted and said knife comprises radially extending blades keyed on said tubular shaft; means revolves said tubular shaft to drive said blades in a rotary cutting stroke past said port means; and a spring urges said tubular shaft toward said die and thereby maintains said pilot interengagement.

9. The combination defined in claim 4 in which a stationary pellet receiving housing is in generally surrounding relation with said knife to receive the pellets cut off thereby; means supplies coolant liquid to said housing; and coolant liquid deflecting means is provided in the path of said liquid to direct said liquid radially and tend to prevent it from reaching and cooling said die.

10. The combination defined in claim 9 in which said housing includes a generally conical portion flaring outwardly from said barrel.

11. The combination defined in claim 9 in which said deflecting means comprises: fan means disposed axially between said knife and coolant liquid supply means and directing an air flow which causes said coolant to form a radial curtain through which pellets cut off are hurled.

12. The combination defined in claim 10 in which said deflecting means comprises a disk, axially outwardly of said knife and rotatable therewith, having circumferentially spaced axially extending deflector blades at the periphery thereof radially outward of said knife.

13. The combination defined in claim 10 in which said means supplying coolant liquid includes an axially extending rotary tube, and a liquid directing member in said tube channels liquid to the inner peripheral surface of said tube.

14. The combination defined in claim 12 in which said tube rotates with said knife and said liquid directing member comprises a disk closing said tube except for circumferentially spaced openings in its periphery.

15. The combination defined in claim 1 in which interrupted advancing flights are provided on said mixer shaft and cooperative radially inwardly projecting teeth are provided in said barrel.

16. In an extruder: a barrel having a chamber; means for supplying material to be extruded to said chamber; a shaft in said chamber with material advancing means thereon for advancing material toward one end of said chamber; means for operating said shaft to advance the material; die means having generally axially parallel extrusion ports at said end of the chamber through which said material is extruded; rotary knife means adjacent said ports for cutting the material extruded therethrough into pellets; pellet collecting housing means in generally surrounding relation with the said knife means and receiving pellets hurled outwardly therefrom as they are cut; means for supplying a liquid coolant to said pellet housing means in an axial flow direction; means for deflecting said coolant radially outwardly to said pellet housing means and preventing it from reaching and cooling said ports; said means supplying coolant liquid including an axially extending rotary tube; and a liquid directing member in said tube for channeling liquid to the inner peripheral surface of said tube; said tube rotating with said knife means and said liquid directing member comprising a disc closing said tube except for circumferentially spaced openings in its periphery.

17. The combination defined in claim 16 in which said deflecting means comprises fan means disposed axially between said knife means and coolant liquid supply means and directing an air flow radially which causes said coolant to form a radial curtain through which pellets cut off are hurled.

18. In a mixer: a barrel having inlet means through which material to be mixed therein is supplied; a mixer shaft having material forwarding means extending axially in said barrel; means for relatively revolving said barrel and mixer shaft and reciprocating said shaft relative to said barrel to advance material forwardly from said inlet means in an axial direction; an extrusion die mounted on said shaft downstream from said inlet means for reciprocation therewith and having port means therein communicating the interior of said barrel with the exterior thereof; and cutting means exteriorly adjacent said port means for cutting off pellets of material extruded through said port means upon relative rotation of said shaft and cutting means; a material collecting housing in generally surrounding relation with the cutting means for receiving pellets as they are cut; and means for directing a coolant to said housing to cool the pellets mounted for axial reciprocation with said shaft and die.

19. The combination defined in claim 18 in which said means for directing a coolant comprises a fan mounted to deflect coolant in a generally radial direction outwardly to prevent it from reaching and cooling the die.

20. The combination defined in claim 18 in which said means for directing a coolant includes means for supplying a liquid coolant in a direction generally toward said die face.

21. The combination defined in claim 1 in which spring means is provided for returning said cutting means with said shaft when said shaft tends to move in its reciprocating stroke in a direction away from said cutting means.

22. In an extruder: a barrel having a chamber; means for supplying material to be extruded to said chamber; a shaft in said chamber with material advancing means thereon for advancing material toward one end of said chamber; means for revolving and reciprocating said shaft to advance the material; a die mounted on the front end of said shaft for reciprocation therewith in said chamber and having generally axially parallel extrusion ports through which said material is extruded; cutting means axially exteriorly adjacent said port means for cutting off lengths of material extruded through said port means; said die including a rearwardly extending sleeve surrounding said ports and spaced from said shaft to define material issuing passage means therebetween leading to said die ports; means for rotating said cutting means relative to said shaft at a speed to cut pellets; and a pellet collecting housing in generally surrounding relation with said cutting means and receiving pellets hurled outwardly therefrom as they are cut.

23. In an extruder: a barrel wall defining a forwardly extending chamber; inlet means for supplying material to be extruded to said chamber; a shaft in said chamber having material advancing means for advancing material toward the front end of said chamber; means for revolving and reciprocating said shaft to advance the material; a plug on the front end of said shaft shaped to substantially seal the front end of said chamber and prevent material from issuing peripherally past said plug as said plug reciprocates and revolves in said chamber; said plug having generally axially parallel extrusion port means, spaced inward of the perimetral surface of the plug, through which said material is extruded, and including channeling means extending rearwardly from said port means for directing material inwardly from the wall defining said chamber to said port means so that it is extruded therethrough in a continuous stream; cutting means axially exteriorly adjacent said port means for cutting off lengths of material extruded through said port means; and means for moving said cutting means in a path relative to said shaft to cut said material into pellets.

24. In a mixer: barrel means having inlet means through which material to be mixed therein is supplied; mixer shaft means extending axially in said barrel means; means for relatively revolving said barrel means and mixer shaft means and reciprocating said mixer shaft means relative to said barrel means to advance material forwardly from said inlet means in an axial direction; extrusion die means on said mixer shaft means downstream from said inlet means and having port means therein communicating the interior of said barrel means with the exterior thereof; a shaft axially aligned with said mixer shaft means exteriorly of said die means; cutting edge means on said latter shaft exteriorly adjacent said port means for cutting off lengths of material extruded through said port means upon relative rotation of said die means and cutting edge means; and yieldable means bearing on said shaft and urging it and said cutting edge means to axially reciprocate with said shaft means.

References Cited

UNITED STATES PATENTS

| | | | |
|---|---|---|---|
| 3,337,913 | 8/1967 | List | 18—12 |
| 3,341,892 | 9/1967 | Mayner | 18—12 |
| 3,353,213 | 11/1967 | Niemeyer | 18—12 |
| 3,362,044 | 1/1968 | Irving | 18—12 |

J. SPENCER OVERHOLSER, Primary Examiner

U.S. Cl. X.R.

18—2.4